J. DINER.
APPARATUS FOR STERILIZING VEGETABLE PRODUCTS.
APPLICATION FILED OCT. 23, 1920.
1,409,286.
Patented Mar. 14, 1922.
2 SHEETS—SHEET 1.
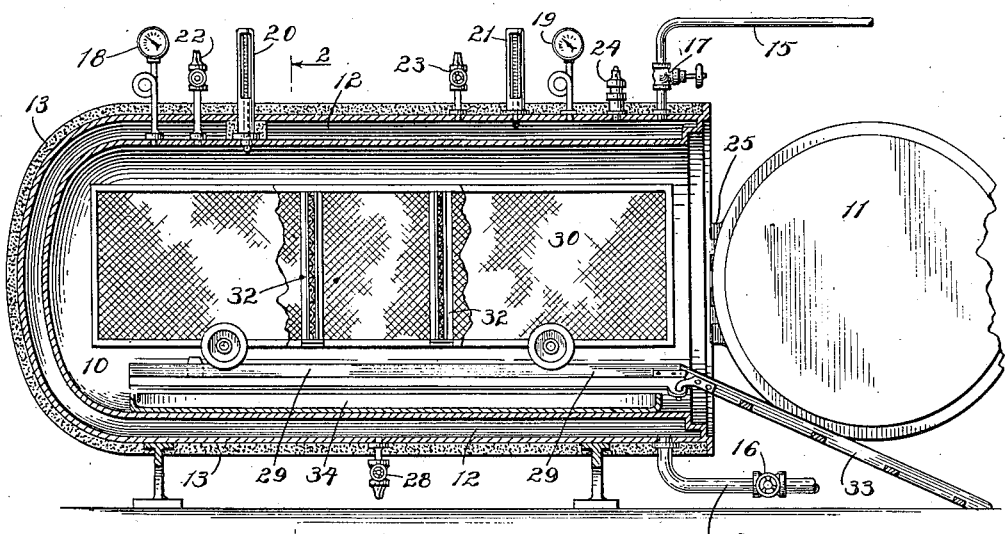
Fig. 1.
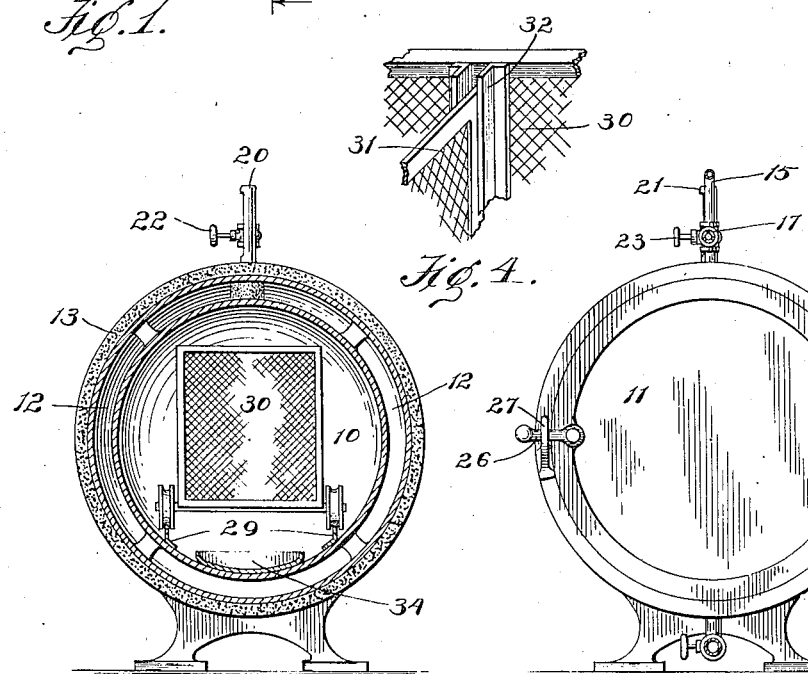
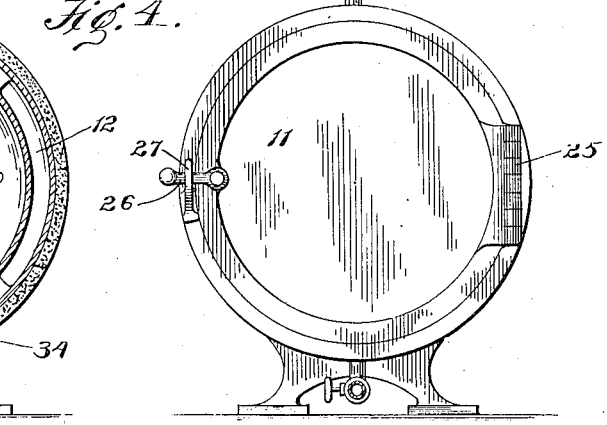
Fig. 2.   Fig. 3.
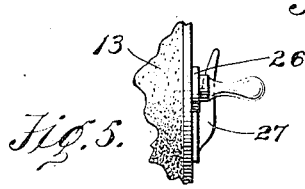
Fig. 5.
Inventor
Jacob Diner
By his Attorney Inventor
Jacob Diner
By his Attorney

UNITED STATES PATENT OFFICE.

JACOB DINER, OF NEW YORK, N. Y., ASSIGNOR TO MANILA STERILIZING CORPORATION, OF MANILA, PHILIPPINE ISLANDS, A CORPORATION OF THE PHILIPPINE ISLANDS.

APPARATUS FOR STERILIZING VEGETABLE PRODUCTS.

1,409,286.   Specification of Letters Patent.   Patented Mar. 14, 1922.

Application filed October 23, 1920. Serial No. 418,870.

*To all whom it may concern:*

Be it known that I, JACOB DINER, citizen of the United States, and resident of New York, in the county of New York and State of New York, have invented certain new and useful Improvements in Apparatus for Sterilizing Vegetable Products, of which the following is a specification.

This invention relates to an apparatus, for sterilizing vegetable products, particularly such products as may be manufactured from tobacco leaf, wherein a sealed compartment is provided in which the products in their manufactured state, are contained while subjected to a heating action.

An object of this invention is to provide an apparatus of the character described wherein manufactured and packaged tobacco products are subjected to the action of a sterilizing agent which will effectively destroy all insect and bacterial elements without impairing the structure or quality of the product or the container holding the same.

A further object is to provide an apparatus as described, wherein means are provided for holding the tobacco products within the sterilizing chamber and wherein simple means are provided for readily withdrawing the said products from the chamber.

Another object is to provide an apparatus of the character described which is simple in its application and economical in cost of manufacture.

These as well as other objects hereinafter disclosed, are attained in the device illustrated in the accompanying drawing in which;

Figure 1, is a longitudinal section of an apparatus embodying the principle of this invention;

Figure 2, is a transverse section taken along the line 2—2 of Figure 1;

Figure 3, is an end view showing the apparatus closed and ready for operation.

Figure 4, is a detail view, in perspective of a part of a conveyor and container hereinafter fully described;

Figure 5, is a detail view showing a latch or locking member employed upon the door or closing member of the apparatus;

Figure 6:
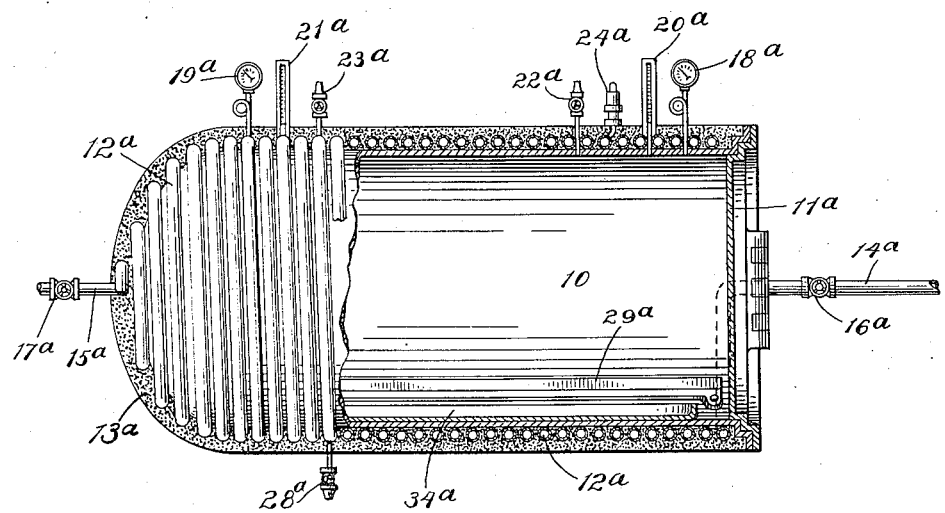
Figures 6 and 7 are longitudinal sections showing modified forms of the apparatus.

Referring, in detail, to the parts, 10 designates a heating or sterilizing compartment, preferably circular in cross-section and provided with a closing-member or door 11. An outer jacket 12 is formed around the sterilizing chamber and may be covered with any suitable heat insulating material 13, preferably an asbestos composition.

The jacket 12, is provided with a conducting pipe 14, by means of which, steam or other expansible heating fluid is allowed to enter the jacket and an outlet or return conductor 15, may be provided to permit the circulation of the expansible fluid between the sterilizing apparatus and the source of fluid supply. Suitable valves 16 and 17 are supplied, by means of which the flow and pressure of the expansible fluid may be controlled. Pressure gauges 18 and 19 are provided which communicate with the sterilizing compartment and jacket, respectively. Thermometers 20 and 21 and pet-cocks or valves 22 and 23 are provided which communicate, respectively, with the sterilizing compartment and the jacket, while a blow-off valve 24, of any approved type, communicates with the jacket, all as clearly shown in Figure 1.

The closing member, which is preferably hinged as at 25, is provided with one or more clamping members 26, which engage beveled bracketed members 27, to tightly wedge the door when closed, and hermetically seal the compartment. A drip-cock 28, may be provided which communicates with the lower portion of the jacket, as shown in Figure 1.

A runway or track 29 is secured to the lower inside portion of the sterilizing compartment and is adapted to support a container and conveyor 30 which is preferably made of wire mesh and which is provided with removable perforated partitions 31, held in position by groove formations 32 upon the inside of the container. An inclined detachable track or run-way 33, may be provided as a continuation of the track 29 to allow the conveyor to be readily withdrawn from the sterilizing compartment.

A trough or tray 34, is provided and located upon the lower side of the sterilizing compartment for a purpose hereinafter set forth.

In the operation of the device, the manufactured vegetable products are placed within the conveyor 30, which is then rolled up into the sterilizing compartment 10; the detachable inclined track 33, is removed and the door 11, tightly closed by means of the clamping member 26. Expansible, heating fluid, preferably steam, is introduced into the jacket 12, and is allowed to flow thereinto until a predetermined pressure is indicated by the pressure gauge 19, communicating therewith, or until a predetermined pressure or temperature is indicated, by the communicating gauge 18 or thermometer 20, in the sterilizing compartment.

The desired degree of heat and pressure is maintained within the compartment until the sterilization of the products therein is complete, whereupon the entrance of the expansible fluid is cut off and the compartment and products therein, allowed to cool and subsequently may be withdrawn.

As a stimulating element to the sterilization process, a chemical, suitable for the purpose, may be held within the trough or pan 34. The fumes of the chemical, during the heating process, will saturate the air within the compartment and thereby enhance the operation. A chemical may also be employed, during the sterilization process, to enhance the flavor and aromatic qualities of the tobacco products, where such treatment is desired in addition to the sterilization.

The pressure of the expansible fluid may be fixed before it enters the jacket or it may be regulated, after it enters the jacket, by means of the various valves shown which are hand operated or by valves which may be automatically controlled.

The means of automatic control is not shown for the reason that the substitution of automatic control for the hand operated valves, consists merely in supplying a thermostatic device which would be connected to the valves and which may be set to operate at any desired temperature.

The entrance of the expansible fluid into the jacket will raise the temperature in the compartment, and the increase in temperature will be limited by the pressure of the fluid in the jacket. The maximum degree of heat desired within the compartment may be fixed by the pressure of the expansible fluid in the manner above described. The degree of heat maintained within the compartment is dependent upon the product contained therein.

Figure 7:
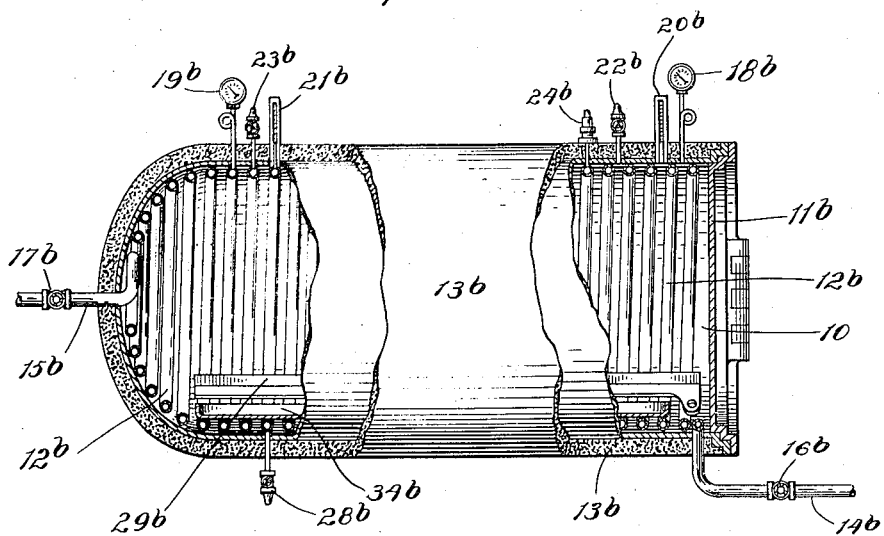

In Figure 6 a modified form of apparatus is shown wherein the jacket is eliminated and a coil of conducting pipe $12^a$, winding around the compartment 10, is substituted, while in Figure 7 a further modification is shown. In this form a coiled conducting pipe $12^b$ is provided within the compartment. In both of these modified forms, valves, gauges, and thermometers, similar to those already described, are provided, and are similarly lettered with the addition of sub "a" and "b."

Various other modifications may be embodied without departing from the spirit of the invention and it is therefore not intended that this application be limited to the particular forms shown.

What is claimed.

In an apparatus for sterilizing packaged tobacco products, a double walled container for such products, means for introducing steam between such walls, providing for equitably heating the inner chamber without the admission of vapor thereinto, means for hermetically sealing the inner chamber whereby the contained tobaccos may reabsorb any constituents volatilized by the applied heat, permitting the sterizilation of the contained tobaccos without substantial loss of moisture or flavor.

Signed at New York, in the county of New York and State of New York, this 27th day of September, A. D. 1920.

JACOB DINER.